(12) United States Patent
Brosche

(10) Patent No.: US 6,822,605 B2
(45) Date of Patent: Nov. 23, 2004

(54) RADAR DEVICE AND METHOD FOR CODING A RADAR DEVICE

(75) Inventor: Thomas Brosche, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,072
(22) PCT Filed: Dec. 18, 2001
(86) PCT No.: PCT/DE01/04741
§ 371 (c)(1),
(2), (4) Date: Nov. 8, 2002
(87) PCT Pub. No.: WO02/054107
PCT Pub. Date: Jul. 11, 2002

(65) Prior Publication Data
US 2003/0184469 A1 Oct. 2, 2003

(30) Foreign Application Priority Data
Jan. 8, 2001 (DE) .......................... 101 00 417

(51) Int. Cl.$^7$ .............................................. G01S 13/32
(52) U.S. Cl. ...................... 342/130; 342/145; 342/189; 342/136
(58) Field of Search ................................ 342/128, 130, 342/134, 136, 145, 189

(56) References Cited
U.S. PATENT DOCUMENTS

| 3,868,686 | A | * | 2/1975 | Magorian | 342/128 |
|---|---|---|---|---|---|
| 4,005,420 | A | * | 1/1977 | McDonald | 342/145 |
| 4,042,925 | A | * | 8/1977 | Albanese et al. | 342/132 |
| 4,236,157 | A | * | 11/1980 | Goss et al. | 102/214 |
| 4,241,347 | A | * | 12/1980 | Albanese et al. | 342/130 |
| 4,513,288 | A | * | 4/1985 | Weathers et al. | 342/201 |
| 5,151,702 | A | | 9/1992 | Urkowitz | |
| 5,293,168 | A | | 3/1994 | Faulkner | |
| 5,376,939 | A | | 12/1994 | Urkowitz | |
| 5,959,571 | A | * | 9/1999 | Aoyagi et al. | 342/145 |
| 6,130,636 | A | * | 10/2000 | Severwright | 342/120 |

FOREIGN PATENT DOCUMENTS

| GB | 1 587 357 | 4/1981 |
|---|---|---|
| WO | WO 00 05779 | 2/2000 |

* cited by examiner

Primary Examiner—Ian J. Lobo
(74) Attorney, Agent, or Firm—Kenyon & Kenyon

(57) ABSTRACT

A radar device is described having means (12) for generating a first code, means (18) for modulating a transmission signal in a transmitting branch using the first code, means (32) for delaying the first code, means (20) for modulating a signal in a receiving branch using the delayed first code, and means for mixing a reference signal with a reception signal, multiple receiving channels ($11_1$, $11_2$, ... $11_k$) being provided, the receiving channels ($11_1$, $11_2$, ... $11_k$) having means ($120_1$, $120_2$, ... $120_k$) for generating additional codes ($C_1$, $C_2$, ... $C_k$), the receiving channels ($11_1$, $11_2$, ... $11_k$) having means ($13_1$, $13_2$, ... $13_k$) for demodulating using the respective additional codes ($C_1$, $C_2$, ... $C_k$), and means (15) being provided for modulating the transmission signal using at least one of the additional codes ($C_1$, $C_2$, ... $C_k$). A method which may be implemented advantageously using the radar device described is also described.

28 Claims, 10 Drawing Sheets

RADAR DEVICE AND METHOD FOR CODING A RADAR DEVICE

FIELD OF THE INVENTION

The present invention relates to a radar device having means for generating a first code, means for modulating a transmission signal in a transmitting branch using the first code, means for delaying the first code, means for modulating a signal in a receiving branch using the delayed first code, and means for mixing a reference signal with a reception signal. The present invention further relates to a method of coding a radar device having the following steps: generating a first code, modulating a transmission signal in a transmitting branch using the first code, delaying the first code, modulating a signal in a receiving branch using the delayed first code, and mixing a reference signal with a reception signal.

BACKGROUND INFORMATION

There are numerous applications for radar devices in greatly varying fields of technology. For example, it is possible to use radar sensors for local range sensor systems in motor vehicles.

Electromagnetic waves are emitted from a transmission antenna in radar devices. If these electromagnetic waves encounter a barrier, they are reflected and, after the reflection, received again by another antenna or the same antenna. Subsequently, the signals received are fed to a signal processing and signal analysis system.

In motor vehicles, radar sensors are used for measuring the distance to targets and/or the relative speed in relation to such targets outside the motor vehicle. Vehicles which are traveling ahead or parking are considered targets, for example.

FIG. 1 shows a schematic illustration of a radar device having a correlation receiver according to the related art. A transmitter 300 is caused by a pulse generator 302 to emit a transmission signal 306 via an antenna 304. Transmission signal 306 encounters a target object 308, where it is reflected. Reception signal 310 is received by antenna 312. This antenna 312 may be identical to antenna 304. After reception signal 310 is received by antenna 312, the signal is transferred to receiver 314 and subsequently fed via a unit 3 having a low-pass filter and an analog/digital converter, to a signal analysis system 318. The special feature of the correlation receiver is that receiver 314 obtains a reference signal 320 from pulse generator 302. Reception signals 310 received by receiver 314 are mixed in receiver 314 with reference signal 320. Receiver 314 may contain an inphase/quadrature (I/Q) demodulator. Through the correlation, the distance to a target object, for example, may be determined on the basis of the time delay from transmission to reception of the radar pulse.

It is desirable to separate interference signals, which arise, for example, from other transmitter antennas, from signal components reflected on the targets. Interference is generated, for example, by other radar sensors, transmitters, consumers on the vehicle electrical system of the motor vehicle, mobile telephones, or by noise. Conventional methods use additional modulation of signals in order to separate interference signals from signal components reflected on targets. Using pseudo-noise coding (PN coding) for interference signal suppression has also already been suggested. Minimizing this type of interference is to be achieved through coding, with the signal-to-noise ratio (S/N) in the output signal of the radar device possibly enhanced. Through such an enhancement of the S/N ratio, either detecting targets having smaller retroreflection cross-sections or reducing the peak pulse power at constant S/N is made possible. The advantage of detecting targets having smaller retroreflection cross-sections is, for example, that not only motor vehicles traveling ahead, but also pedestrians or bicyclists, are detected by a motor vehicle with greater probability. The reduction of the peak pulse power has the consequence that less interference is caused in other systems, for example, radio relay systems; in this connection, the reduction of the peak pulse power makes approval of the sensors by the relevant regulating authorities easier.

Furthermore, when multiple radar sensors are used, the aim is to receive and analyze the transmission signals of the respective other sensors. Therefore, one wishes to be able to differentiate between the signals of other radar sensors.

SUMMARY

The present invention is based on the radar device provided with multiple receiving channels. The receiving channels have means for generating additional codes, means for demodulating using the respective additional codes, and means for modulating the transmission signal using at least one of the additional codes. In this way, it is possible to differentiate between the signals of multiple radar sensors. Therefore, an improvement of the interference signal suppression and/or an enhancement of the S/N ratio occurs through the modulation of the signals with a decoupling of various radar sensors by using different codes. In this manner, the detection of apparent targets may be suppressed, and the target geometry may be determined more precisely.

One of the signals is preferably modulated using the first code through amplitude modulation (ASK; "amplitude shift keying") and the other signal is modulated using the first code through phase modulation (PSK; "phase shift keying"). It is also possible to combine amplitude modulation with phase modulation, so that different types of modulation are usable in the scope of an exemplary embodiment of the present invention. It is also possible to use frequency modulation (FSK; "frequency shift keying").

In the present invention, the transmission signal may be modulated using the first code through phase modulation (PSK) and the signal is modulated in the receiving branch using the first code through amplitude modulation (ASK) or frequency modulation (FSK). If types of modulation other than phase modulation (PSK) are used in the receiving branch, then phase modulation (PSK) may be used in the transmitting branch in the scope of an exemplary embodiment of the present invention.

However, it may also be advantageous for the transmission signal to be modulated using the first code through amplitude modulation (ASK), frequency modulation (FSK) or phase modulation (PSK), and for the signal to be modulated in the receiving branch using the first code through phase modulation (PSK). Therefore, if there is phase modulation (PSK) in the receiving branch, then greatly varying types of modulation are usable in the transmitting branch.

The radar device is particularly advantageously refined if one of the combinations of types of modulation cited is used for the additional codes independently of the types of modulation used for the first code.

A low-pass filter is preferably provided for filtering the signals before demodulation. In this manner, it is possible to use a low clock frequency for the additional codings. This particularly may have the advantage that the coding in the receiving channels does not have to be delayed. Implementation of a very large number of channels with only a low additional outlay for components is possible, these components being clocked using relatively low frequencies. On the high-frequency domain, only one additional modulation must be provided, possibly through an additional modulator. The implementation of the receiving channels on the low-frequency domain also has the advantage that there is no worsening of the S/N ratio.

It may be advantageous if the code is a pseudo-noise code (PN code). The use of PN codes for interference signal suppression has been extensively described in the literature, so that an exemplary embodiment of the present invention may be realized particularly well using PN codes.

The generation of the additional codes and the modulation are preferably performed using a clock frequency which is a whole-number fraction of the pulse repetition frequency for generating the first code. In this way, the code generations a to one another with regard to the various codes.

It is preferable for k receiving channels to be provided, for k means for generating k additional codes to be provided, and for each of the k additional codes to be orthogonal to each of the other k−1 additional codes. Due to the orthogonality of the codes, it is possible, in the event of overlapping detection ranges of the respective sensors, to analyze only the appropriate sensors in a respective receiving channel. Furthermore, the circuits for orthogonal codes are simpler to produce.

A counter and multiple EXOR gates are provided for generating the orthogonal codes. In this way, ideal decouplings of the respective radar sensors may be generated, for example through cyclic inversion.

A toggle flipflop (TFF) and an EXOR gate are provided for generating the orthogonal codes. Two orthogonal codes may be generated in a particularly simple way by one TFF.

In this connection, PSK may be used in the receiving branch, an uncoded receiving channel may be additionally provided. Using a TFF and an EXOR gate, the implementation of three receiving channels is therefore possible due to the additional uncoded receiving channel.

Digital means are preferably provided for controlling the delay. These types of digital means, for example a microcontroller or a digital signal processor, are capable of delaying both the pulse repetition frequency and the PN code in a suitable way, so that the signals experience the possibly necessary correlation in the receiving branch.

However, it may also be advantageous if circuit means are provided for controlling the delay. In addition to controlling the delay using digital means, it is therefore also possible to use hardware to implement the delay.

Means may be provided for blanking phase transitions. Since the switchover of the phase angle does not occur instantaneously in the real construction, errors arise after the integration of the signal. If, however, the phase-modulated signal is blanked during the transition time between the various phase angles, these errors may be minimized.

An exemplary embodiment of the present invention builds on the method in that multiple receiving channels are provided, additional codes are generated in the receiving channels, signals are modulated in the receiving channels using the respective additional codes, and the transmission signal is modulated using at least one of the additional codes. In this way it is possible to differentiate between the signals of multiple radar sensors. Therefore, an improvement of the interference signal suppression and/or an enhancement of the S/N ratio occurs through the modulation of the signals with a decoupling of various radar sensors by using different codes. In this manner, the detection of apparent targets may be suppressed, and the target geometry may be determined more precisely.

It is particularly preferred if one of the signals is modulated using the first code through amplitude modulation (ASK; "amplitude shift keying") and the other signal is modulated using the first code through phase modulation (PSK; "phase shift keying"). It is also possible to combine amplitude modulation with phase modulation, so that different types of modulation are usable in the scope of the present invention. It is also possible to use frequency modulation (FSK; "frequency shift keying").

It is possible for the transmission signal to be modulated using the first code through phase modulation (PSK) and for the signal to be modulated in the receiving branch using the first code through amplitude modulation (ASK) or frequency modulation (FSK; "frequency shift keying"). If types of modulation other than phase modulation (PSK) are used in the receiving branch, then phase modulation (PSK) is used in the transmitting branch in the scope of an exemplary embodiment of the present invention.

The transmission signal may be modulated using the first code through amplitude modulation (ASK), frequency modulation (FSK) or phase modulation (PSK), and the signal may be modulated in the receiving branch using the first code through phase modulation (PSK). Therefore, if there is phase modulation (PSK) in the receiving branch, then greatly varying types of modulation are usable in the transmitting branch.

In an exemplary method according to the present invention, one of the combinations of types of modulation cited is used for the additional codes independently of the types of modulation used for the first code.

The signals may be filtered in a low-pass filter before demodulation. In this manner, it is possible to use a low clock frequency for the additional codings. This may have the advantage that the coding in the receiving channels does not have to be delayed. Implementation of a very large number of channels with only a low additional outlay for components is possible, these components being clocked using relatively low frequencies. On the high-frequency domain, only one additional modulation must be provided, possibly through an additional modulator. The implementation of the receiving channels on the low-frequency domain also has the advantage that there is no worsening of the S/N ratio.

The codes are preferably pseudo-noise codes (PN codes). The use of PN codes for interference signal suppression has been extensively described in the literature, so that an exemplary embodiment of the present invention may be realized particularly using PN codes.

In an exemplary embodiment of the present invention, the generation of the additional codes and the demodulation may be performed using a clock frequency which is a whole-number fraction of the pulse repetition frequency for generating the first PN code. In this way, the code generations and the demodulations are adapted to one another with regard to the various codes.

It may be possible for k receiving channels to be provided, for k means for generating k additional codes to be provided, and for each of the k additional codes to be orthogonal to each of the other k−1 additional codes. Due to the orthogonality of the codes, it may be possible, in the event of overlapping detection ranges of the respective sensors, to analyze only the appropriate sensors in a respective receiving channel. Furthermore, the circuits for orthogonal codes may be simpler to produce.

The orthogonal codes may be generated by a counter and multiple EXOR gates. In this manner decouplings of the respective radar sensors may be generated, for example, through cyclic inversion.

In an exemplary embodiment, the orthogonal codes are generated by a toggle flipflop (TFF) and an EXOR gate. Two orthogonal codes may be generated in a particularly simple way by one TFF.

If PSK is used in the receiving branch, an uncoded receiving channel is additionally provided. Using a TFF and an EXOR gate, the implementation of three receiving channels may therefore be possible due to the additional uncoded receiving channel.

It is useful for the delay to be controlled through digital means. These types of digital means, for example a microcontroller or a digital signal processor, are capable of delaying both the pulse repetition frequency and the PN code in a suitable way, so that the signals experience the correlation in the receiving branch.

However, it may also be advantageous if the delay is performed through circuit means. In addition to controlling the delay using digital means, it may therefore also be possible to use hardware to implement the delay.

Furthermore, it is advantageous if phase transitions are blanked. Since the switchover of the phase angle does not occur instantaneously in the real construction, errors arise after the integration of the signal. If, however, the phase-modulated signal is blanked during the transition time between the various phase angles, these errors may be minimized.

An exemplary embodiment of the present invention is based on the unexpected finding that separation of multiple receiving channels is possible through simple means. The coding of the radar sensor and the additional codings, for implementing multiple receiving channels, are separated. The additional coding has no further tasks. In this way, it is possible to design this coding very simply and to use a relatively low clock frequency. The delay of the reference signal may be necessary for the functioning of the radar is performed in the first code. The additional coding may not have to be delayed in the receiving channels due to the low clock frequency used for this purpose. Even if a very large number of channels are implemented, only a small additional outlay for components, which are clocked using a relatively low frequency, may be necessary. Only one additional modulation is necessary on the HF domain. It is also advantageous for the codes used, i.e., the first code and the additional codes for separating the receiving channels, to each be selectable independently from one another according to the respective requirements. The digital circuits for code generation and for code shifting, and the switches and mixers, may be integrated well, for example in a "monolithic microwave integrated circuit" (MMIC).

DETAILED DESCRIPTION

Figure 1:
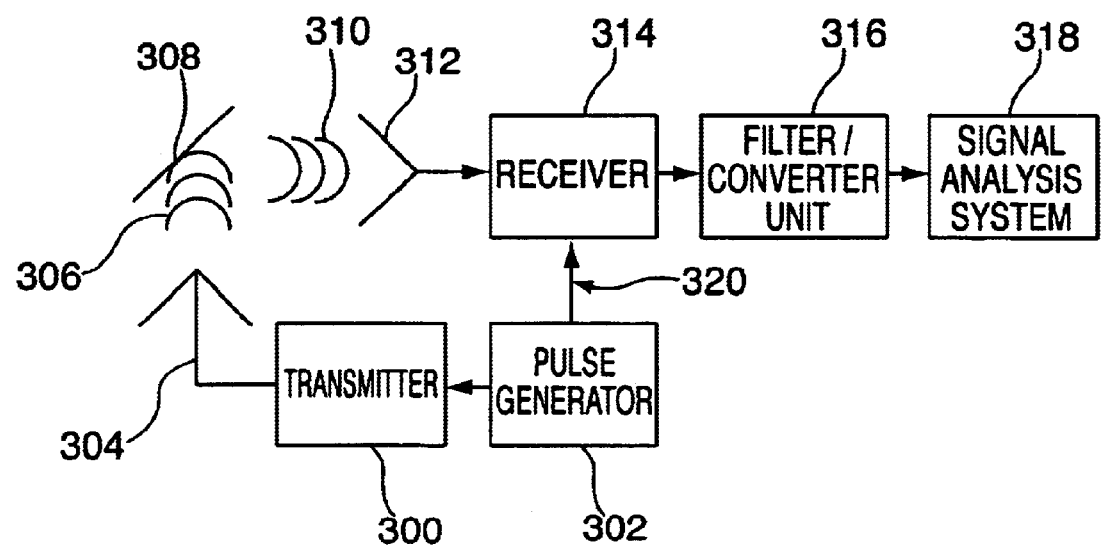
FIG. 1 shows a block diagram of the radar device according to the related art.
Figure 2:
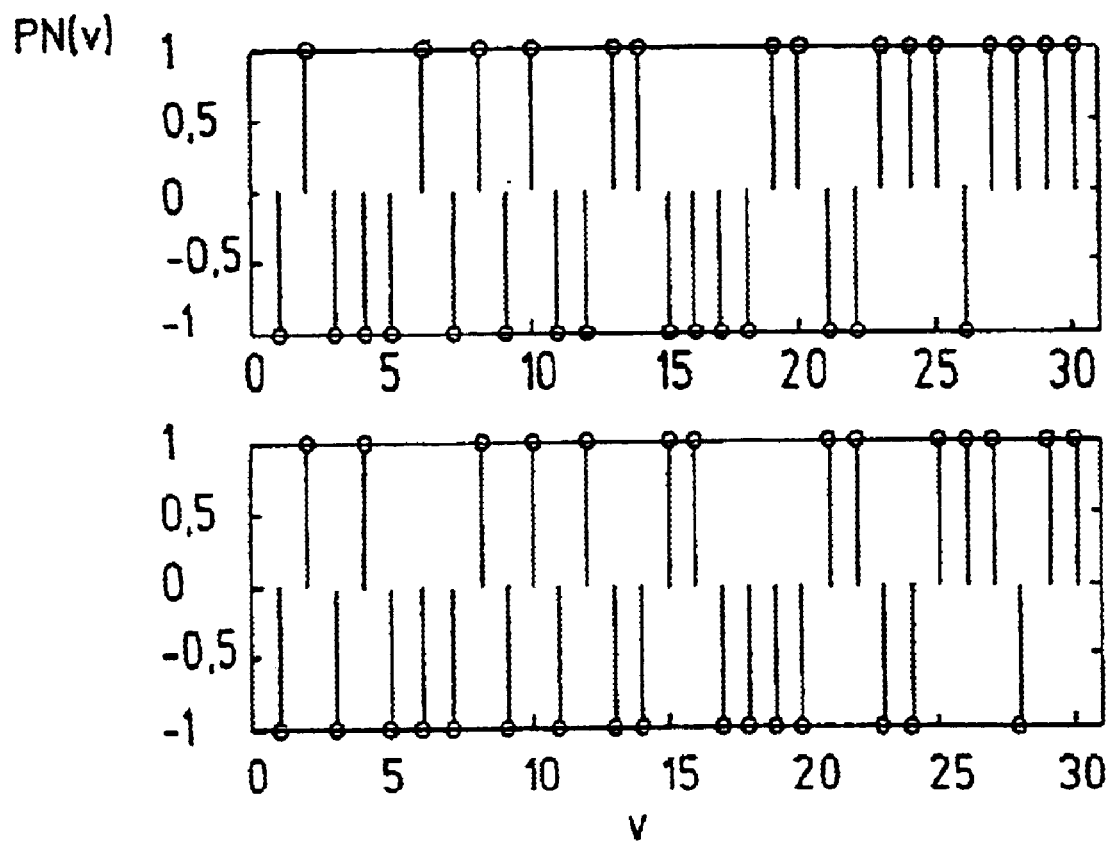
FIG. 2 shows sections of PN codes.

FIG. 2 shows sections of PN codes. A PN code is illustrated as a function of parameter v in the top part of FIG. 2. The bottom part of FIG. 2 shows the same PN code having a shift by v=2. These types of PN codes and their shift are used in the scope of an exemplary embodiment of the present invention to improve the S/N ratio and the ratio of useful signal to Doppler leakage signal. In principle, such an improvement is achieved by elevating the pulse repetition frequency $f_{PW}$. However, the maximum pulse repetition frequency is limited by the range of the radar:

$$f_{PW,max} = c/2R_{max}$$

in which $f_{PW,max}$: maximum pulse repetition frequency c: speed of light $R_{max}$: range of the radar.

Targets at distances which lie beyond $R_{max}$ are not detected. If the pulse repetition frequency is increased, the measurement for target distances between $c/(2f_{PW})$ and $R_{max}$ is no longer unique. However, in the scope of the present invention, the S/N ratio is still achieved by elevating the pulse repetition frequency, since the pulse repetition frequency may be elevated by using a PN coding, without endangering the uniqueness of the distance measurement. The reason the S/N ratio is improved by elevating the pulse repetition frequency is that, if the transmission function of the low-pass filter used is unchanged, a larger number of pulses are integrated in the reception signal. If the pulse repetition frequency is elevated by a factor m, for example, then an S/N ratio elevated by m results for coherent integration. Accordingly, if the S/N ratio is $(S/N)_n$ before the elevation of the pulse repetition frequency, then it is $(S/N)_{nm}$ after the elevation of the pulse repetition frequency. However, if the original S/N ratio during the integration of n pulses $(S/N)_{nm}$ is sufficient, then peak pulse power $P_t$ may also be lowered while maintaining the S/N ratio for elevated pulse repetition frequency $f_{PW}$, $P_t$ being proportional to the reciprocal of the pulse repetition frequency. A section of an 8-bit PN coding selected for exemplary purposes is illustrated in the top part of FIG. 2. If the code used has a suitable autocorrelation function (ACF), then the uniqueness range for the distance measurement may be increased in this manner by the coding of the signal.

Figure 3:
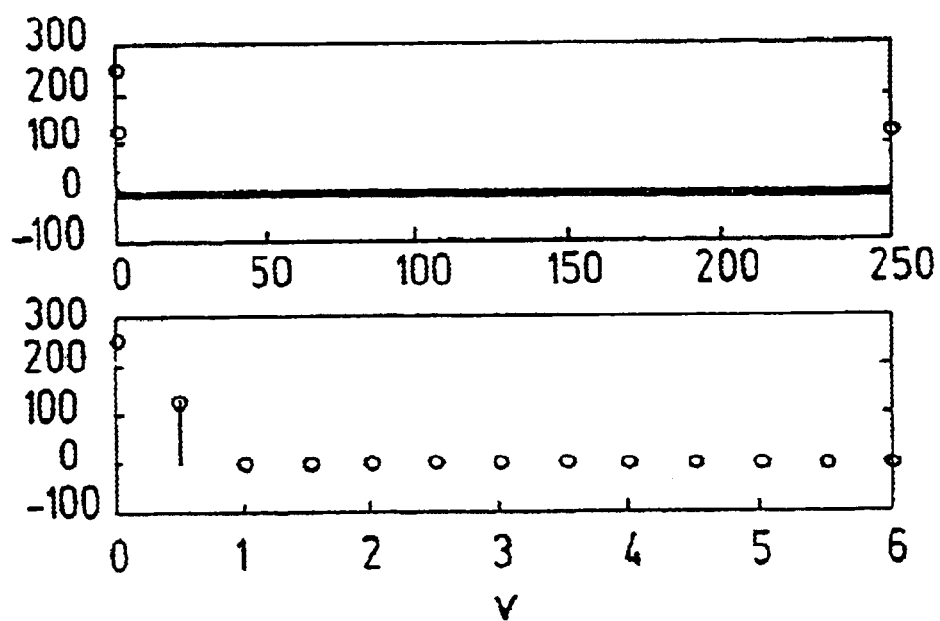
FIG. 3 shows an autocorrelation function of a PN code over various value ranges.

The relationships with regard to the autocorrelation function are described in more detail in FIG. 3. In the top part of FIG. 3, the autocorrelation function of an 8-bit PN code is illustrated over the value range from v=1 to v=255. In principle, the autocorrelation function of the PN code represents the product after multiplication of the PN code by itself and subsequent summation as a function of the shift of the code by v pulses. In the bottom part of FIG. 3, a section of the autocorrelation function of an 8-bit PN code selected for exemplary purposes is illustrated over shifts from 0 to 6 pulses. If a relative shift of 0 seconds is now set between the reception signal and the reference signal, then the maximum value of the autocorrelation function is obtained for an 8-bit PN code, which is equal to $2^8-1=255$. If the value of the shift is increased, then the value of the autocorrelation function is reduced. A value of −1 is obtained for the example illustrated in FIG. 3 from a displacement of $v\geq 1$. This clearly distinguished maximum of the autocorrelation function of a selected PN code at v=0 allows precise measurement of the time delay of the signal received and therefore a unique determination of the target distance.

For an interval of the shift of $\Delta v \leq 0.5$, a sufficient resolution of the autocorrelation function is obtained for interpolation of the maximum. Due to the periodicity of the autocorrelation function, the uniqueness range of this code extends from v=0 to $v_{max}=N-1$. The peak of the autocorrelation function may be assigned a spatial scope as a function of the clock frequency, using which the individual chips are modulated to the radar signal. For a code having a frame length (period) of N chips and a chip clock frequency or pulse repetition frequency $f_{PW}$, a spatial uniqueness range which extends from 0 to $R_{uni}$ results, where the equation $$R_{uni}=(N-1)c/2f_{PW}$$

applies.

The condition $$R_{uni} \geq R_{max}$$

is to be placed on the uniqueness range. Otherwise, a multivalue measured value $$\hat{r}=r-nR_{uni}$$

where n=0, 1, . . . and $\hat{r} \geq 0$, would exist for the target distances which lie between $R_{uni}$ and $R_{max}$.

For monitoring the range from 0 to $R_{inst}$ which is instrumented for the radar sensor, a maximum code shift of $$v_{inst}=2R_{inst}f_{PW}/c$$

pulses would then be necessary.

Figure 4:
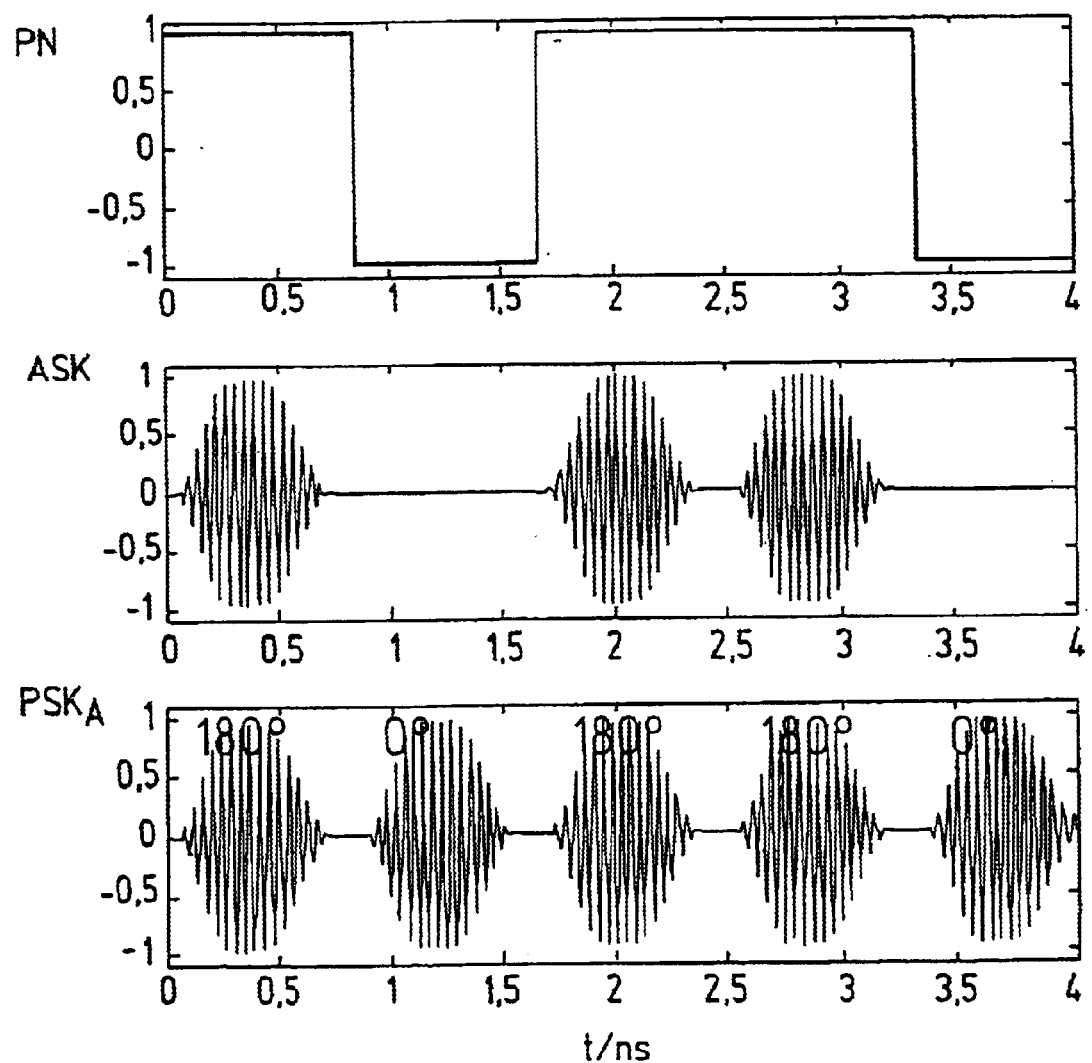
FIG. 4 shows sections of a PN code and of signals modulated using the PN code.

In FIG. 4, principal types of modulation of a carrier frequency are illustrated. The transmission signal of the radar sensor is produced through modulation of carrier frequency $f_0$, generated using a local oscillator (LO), using the appropriate PN code. In principle, various types of modulation are available, for example PSK, QPSK, ASK, FSK, and MSK. An exemplary embodiment of the present invention primarily relates to the ASK and PSK types of modulation and to PSK modulation having blanking of phase transitions. A section of an 8-bit PN code is illustrated in the top part of FIG. 4. The middle part shows a signal ASK which is amplitude modulated using the PN code. The bottom part shows a signal $PSK_A$ which is phase modulated using the PN code, the phase transitions being blanked.

In the real construction of the sensor, transition times arise between the on or off state of the signal during ASK and PSK modulation. In the modeling of the example illustrated in FIG. 4, these times are taken into consideration using a duration of, for example, 100 ps for the transition between 0° and 180°. For PSK, the carrier frequency must be a whole-number multiple of the pulse repetition frequency and/or the chip clock frequency. In order to achieve optimum interference signal suppression, it is necessary to obtain a value as great as possible after one integration of the autocorrelation function over one or more frames at v=0. For code shifts between v=1 to the maximum code shift $v_{inst}$ used, values which are as small as possible should arise. In this context, PSK modulation of carrier frequency $f_0$ is expedient. The phase angle of $f_0$ is blanked for PSK modulation between 0° and 180°.

Since the switchover of the phase shift does not occur instantaneously in the real construction, errors arise after the integration of the signal. Therefore, ratio δ between the amplitude at v=0 and the maximum amplitude at v>1 is reduced. If the PSK-modulated signal is blanked during the transition time between various phase angles, as is illustrated in the bottom part of FIG. 4, these errors may be minimized.

Figure 5:
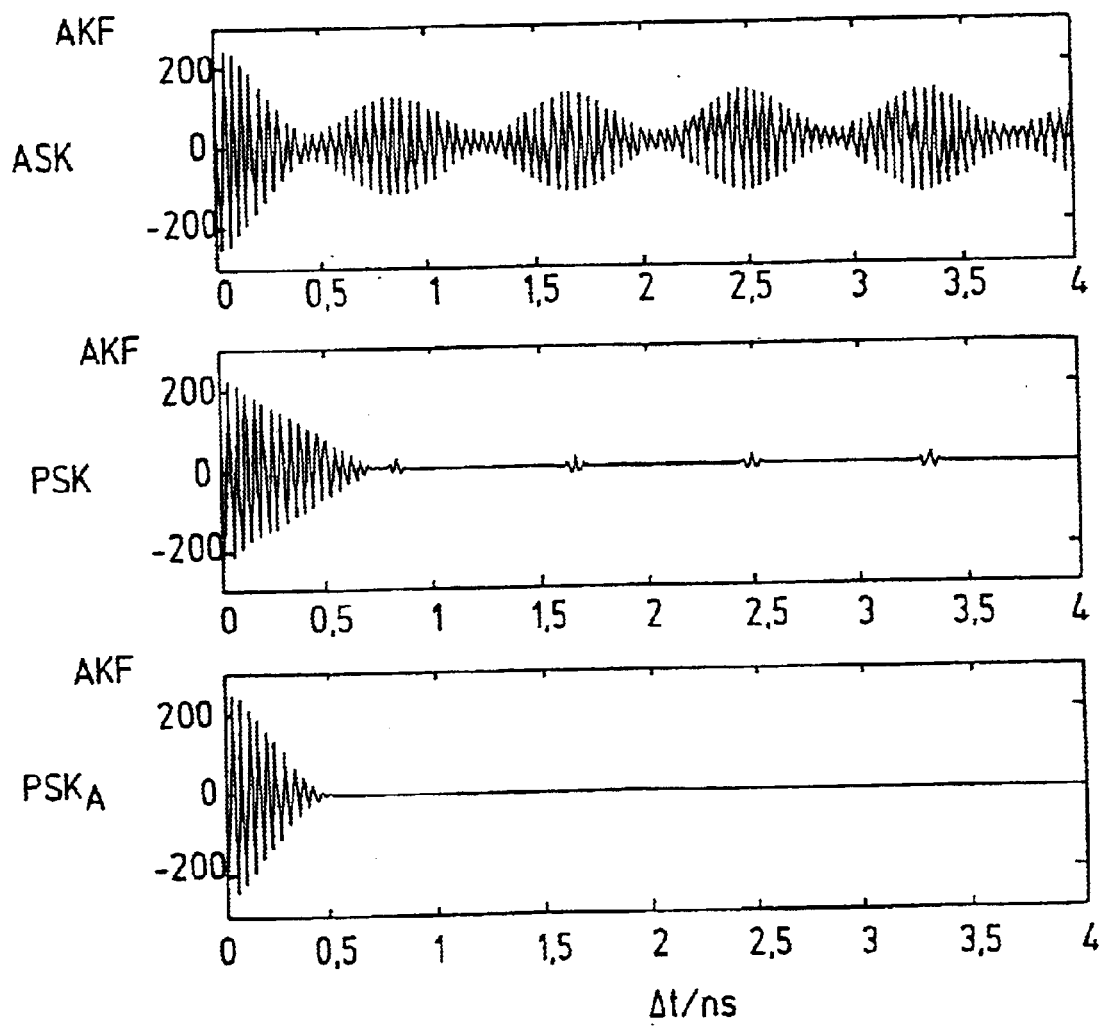
FIG. 5 shows autocorrelation functions of signals modulated in various ways.

Examples of autocorrelation functions for various scenarios are illustrated in FIG. 5. The top part of FIG. 5 shows the autocorrelation function of the ASK-modulated signal. The middle part shows an autocorrelation function of phase-modulated signal PSK having non-ideal phase transitions, the phase transitions not being blanked. The bottom part shows a phase modulation of signal $PSK_A$ having blanking of the phase transitions. For ASK modulation, δ≈2 results in the example illustrated. For PSK modulation without blanking of the phase transitions, δ≈10 results, and for a $PSK_A$ modulation having blanking of the phase transitions, δ≈225 results. Therefore, significantly better detection of the maximum and/or more effective interference signal suppression is achieved through the blanking.

Through the combination of ASK and PSK, ASK being used in the transmitting branch and PSK being used in the receiving branch, or vice versa, δ theoretically approaches infinity. This means that the autocorrelation function for v>1 is zero. The improvement of the S/N ratio is lower by approximately 3 dB for the same chip clock frequency $f_{PW}$ than for pure phase modulation PSK. For amplitude modulation ASK in the transmitting branch and phase modulation PSK in the receiving branch, the average transmission power is reduced by the same factor. Through the blanking of the phase transitions, the width of the maximum of the autocorrelation function is reduced and/or the bandwidth of the amplitude spectrum is enlarged. This improves the separability between different targets for the same clock frequency $f_{PW}$, a smaller interval being necessary for code shift Δv, however. Alternatively, pulse width τ may also be elevated at approximately constant local resolution, separability, interval, and bandwidth.

Figure 6:
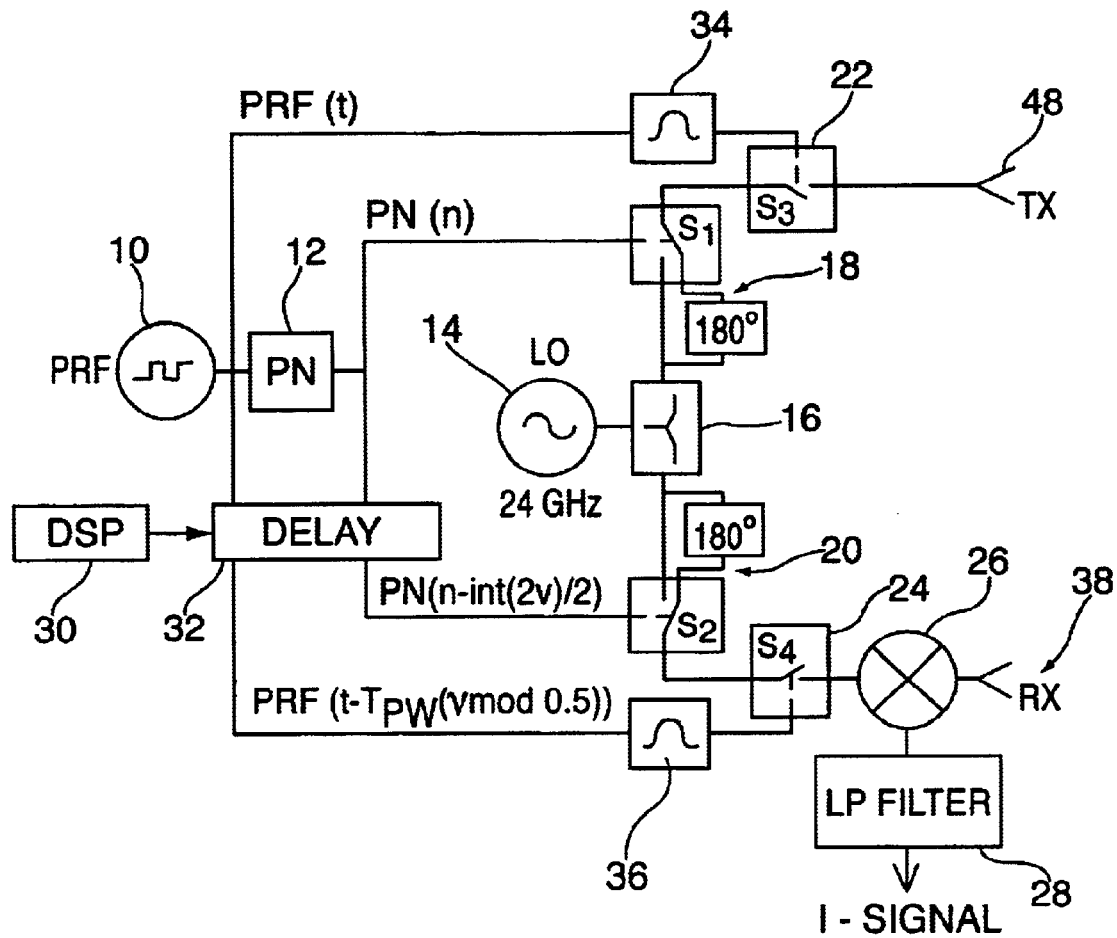
FIG. 6 shows a schematic illustration of an embodiment of a radar device.

FIG. 6 shows a schematic illustration of an embodiment of a radar device, with reference to which basic principles may be explained. The schematic illustration is greatly simplified. In particular, only the inphase(I) channel is illustrated and the quadrature(Q) channel was omitted, it being possible for this channel to be constructed identically in principle, however. The radar device includes a clock generator 10 for generating a pulse repetition frequency PRF. The pulse repetition frequency is fed to a PN generator 12. Furthermore, a local oscillator 14 (LO) is provided which generates a carrier frequency $f_0$ of, for example, 24 GHz. The carrier frequency is fed from local oscillator 14 to a 3 dB power divider 16. The power divider supplies a transmitting branch via a first phase modulator 18. Phase modulator 18 is schematically illustrated here as a switch. It may, for example, be implemented as a mixer. Furthermore, power divider 16 supplies a receiving branch via a second phase modulator 20, which may also be implemented as a mixer. The outputs of phase modulators 18, 20 are each connected to switches 22, 24 for blanking the phase transitions. The output of switch 22 in the transmitting branch provides the transmission signal. The output of switch 24 in the receiving branch is connected to a mixer 26. In addition to the output signal of switch 24, the reception signal is also input into this mixer 26. The output of mixer 26 is connected to a low-pass filter 28, which provides the inphase(I) signal as an output signal. Furthermore, a microcontroller and/or a digital signal processor 30 is provided, which controls a delay 32. This delay is used for delaying both the pulse repetition frequency and the PN code in the receiving branch. While, in the transmitting branch, the pulse repetition frequency is given directly to a pulse shaper 34, whose output signal switches the switch for blanking 22 the phase transitions in the transmitting branch, the pulse repetition frequency is given via delay 32 to a pulse shaper 36 in the receiving branch, which switches switch 24 for blanking the phase transitions in the receiving branch. Furthermore, the PN code is directly used for phase modulation in the transmitting branch, in that it switches switch 18 for phase modulation. In the receiving branch, the PN code is fed to switch 20 for phase modulation using a delay. The receiving branch ends in a receiving antenna 38; the transmitting branch ends in a transmitting antenna 48.

The radar device shown in FIG. 6 operates as follows. Local oscillator 14 generates a carrier frequency which is supplied to the transmitting branch via power divider 16. A part of the power of the carrier frequency is supplied to the receiving branch to generate a reference signal. The carrier frequency is phase modulated by phase modulator 18 in the transmitting branch. The phase modulation is performed through the PN code, which is generated by PN generator 12. The phase-modulated signal is fed from phase modulator 18 to a switch 22 for blanking the phase transitions. This switch is activated by an output signal of pulse shaper 34, which generates a time window for the blanking as a function of pulse repetition frequency 10. Pulse repetition frequency 10 is therefore responsible for the undelayed definition of a time window for pulse shaper 34 and for the undelayed provision of the PN code for phase modulation 18. In the receiving branch, the output signal of power divider 16 is also phase modulated in phase modulator 20. The output signal of phase modulator 20 is supplied to switch 24 for blanking, switch 24 being activated by an output signal of pulse shaper 36. Pulse shaper 36 is controlled by the pulse repetition frequency using a delay. Phase modulator 20 is also switched by a delayed PN code.

In principle, the sequence of phase switchover switches 18, 20 and respective switches for blanking 22, 24 is arbitrary. The blanking and/or phase switchover may also be located between receiving antenna 38 and mixer 26. Furthermore, the blanking may be located between mixer 26 and low-pass filter 28.

Figure 7:
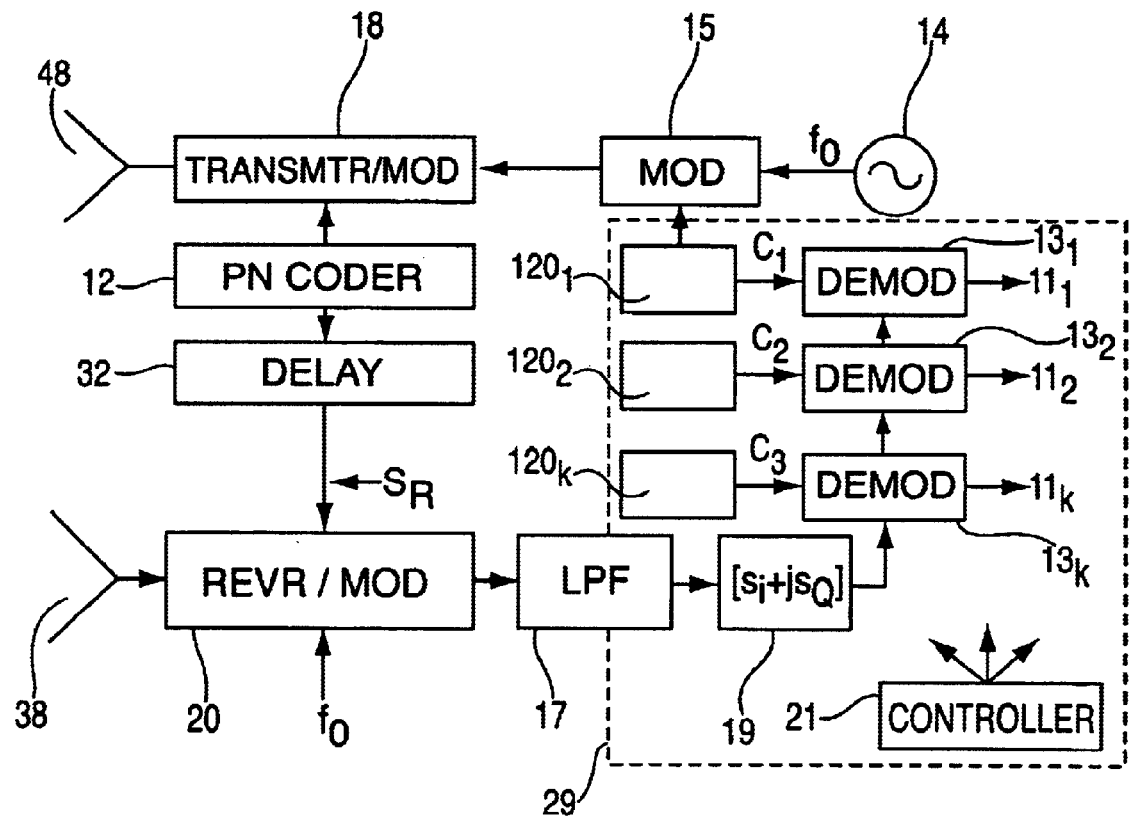
FIG. 7 shows a block diagram of a first embodiment of a radar device according to the present invention.

A block diagram of a first embodiment of a radar device according to the present invention is illustrated in FIG. 7. A transmitting unit T having means 18 for modulating a transmission signal is equipped with a transmitting antenna 48. Means 18 for modulating are supplied a PN code by a PN coder 12. This PN code is also transmitted to means 32 for delaying the code. The delayed code is supplied to a receiving unit R having means 20 for modulating a signal in a receiving branch. The delayed code is therefore used as a reference signal $S_R$. The receiver is equipped with a receiving antenna 38. Carrier frequency $f_0$ is transmitted to transmitting unit T from a local oscillator 14 via means 15 for modulating the transmission signal. This carrier frequency $f_0$ is also input into receiving unit R, where it is mixed with the reception signal. The output signal of the receiving unit is filtered and amplified by a low-pass filter and amplifier 17. Subsequently, the signal is fed to means 19 for absolute value generation, the absolute value being formed in this case from the I-signal and the Q-signal: $|s_I + js_Q|$. This I/Q absolute value is supplied to means $13_1, 13_2, \ldots 13_k$, which are each assigned to a receiving channel $11_1, 11_2, \ldots 11_k$. Each of these demodulation means $13_1, 13_2, \ldots 13_k$ operates using a specific code $C_1, C_2, \ldots C_k$, these being provided by respective means $120_1, 120_2, \ldots 120_k$ for generating the codes. One of these codes, code C1 in the present case, is used for the purpose of modulating the local oscillator signal in means 15 for modulating the transmission signal.

In the present general case shown in FIG. 7, means 18 for modulating a transmission signal, means 20 for modulating a signal in a receiving branch, means $13_1, 13_2, \ldots 13_k$ for demodulating, and means 15 for additional modulation of the transmission signal may perform an amplitude modulation ASK, a frequency modulation FSK, or a phase modulation PSK. The entire system is controlled by a control system 21.

The code generation and the demodulation are preferably performed in receiving channels $11_1, 11_2, \ldots 11_k$ using a relatively low clock frequency, preferably using a whole-number fraction $f_{PN}/m$ (m=1, 2, ... ) of the repetition frequency of a frame (period) of PN code $f_{PN}$. The additional coding and demodulation is possible on low-frequency domain 29, so that for this reason only a relatively low outlay is necessary for hardware.

If the detection ranges of the respective sensors overlap and the transmission signal of each of these sensors is modulated using a different suitable code $C_1, C_2, \ldots C_k$, then the respective transmission signal of each sensor reflected on the targets may be evaluated in its own sensor and the reflected transmission signal of the respective other sensors may be evaluated in respective receiving channel $11_1, 11_2, \ldots 11_k$.

Figure 8:
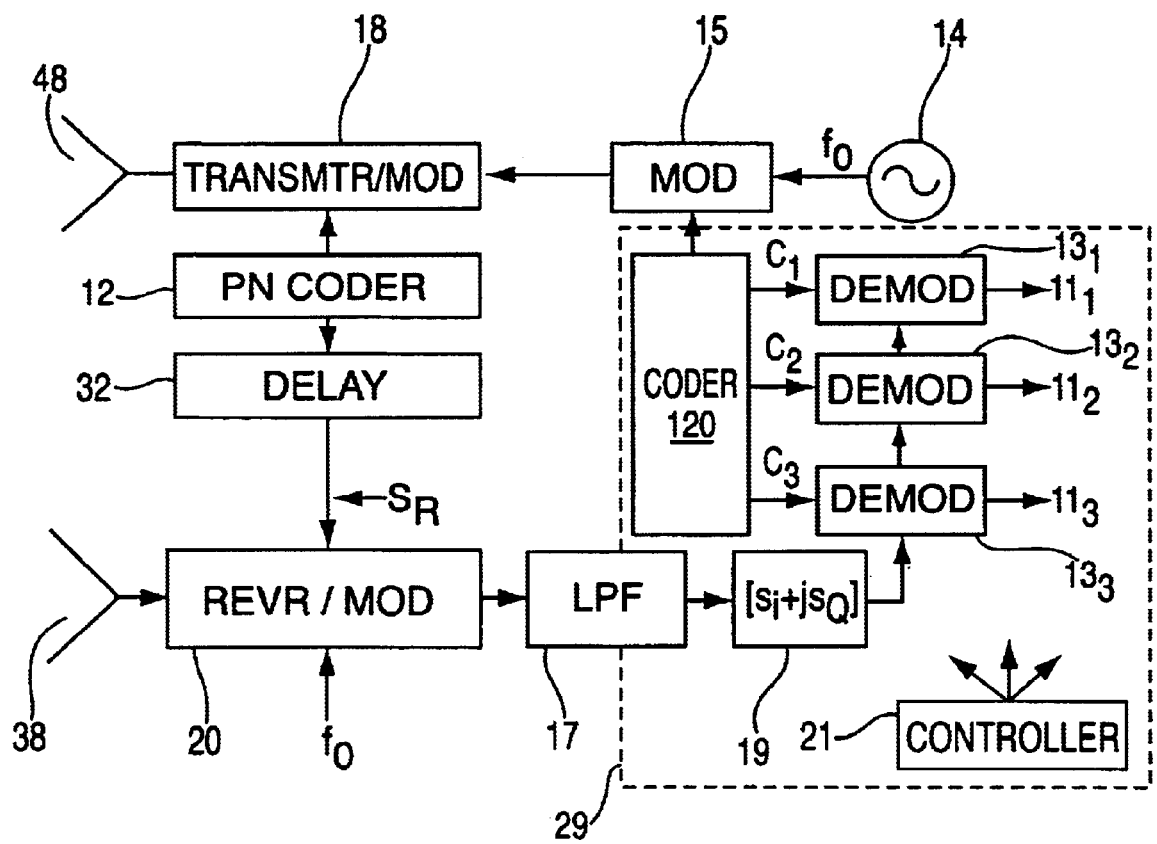
FIG. 8 shows a block diagram of a second embodiment of a radar device according to the present invention.

FIG. 8 shows an exemplary embodiment of a radar device according to the present invention. Components which correspond to those from FIG. 7 are indicated using identical reference numbers. The special feature of the switch shown in FIG. 8 is that three orthogonal codes are generated by coder 120. In the present case, modulators 15, 20 may, for example, perform a PSK modulation. Modulator 18 performs an ASK modulation or a PSK modulation. Demodulators $13_1, 13_2, 13_3$ operate as ASK modulators.

Figure 9:
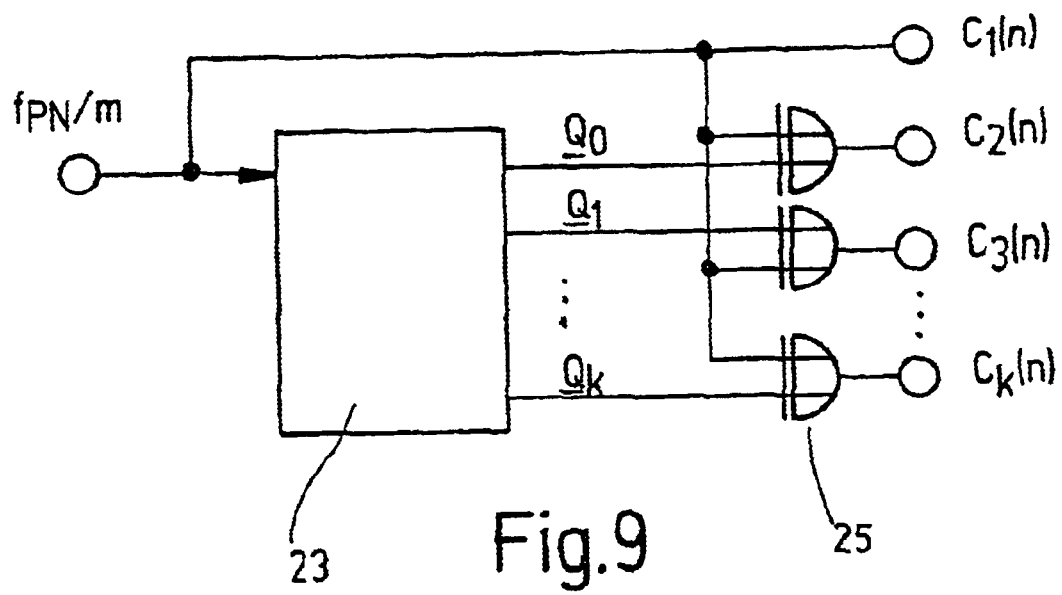
FIG. 9 shows a schematic circuit diagram for the generation of orthogonal codes.

An example of the generation of the orthogonal codes is schematically described with reference to FIG. 9. It is performed with the aid of a counter 23 and multiple EXOR gates 25. Ideal decoupling of the respective radar sensors is obtained, for example, through cyclic inversion.

The equation:

$$C_1(n) = (-1)^n; n=1, 2, \ldots$$

applies for deriving 1st code $C_1(n)$.

In general, the equation:

$$C_i(n) = (-1)^{round(n/2^{(i-1)})} C_{i-1}(n); i=2 \ldots k$$

applies for all additional orthogonal codes $C_1(n)$, in which: $C_1 = -1, 1, -1, 1, -1, \ldots$; $C_2 = 1, -1, -1, 1, 1, -1, -1, \ldots$; $C_3 = 1, 1, 1, -1, -1, -1, -1, 1, 1, 1, 1, \ldots$, etc.

Frame length N of the PN code doubles for each derivation i and it therefore totals $2^i N$. Since the individual code elements (chips) must be integrated over at least one frame length, the limiting frequency of the low-pass filter used for integration is possibly to be lowered by the factor $2^k$. For example, at k=3 different channels, a frame length of N*8 chips is obtained.

Figure 10:
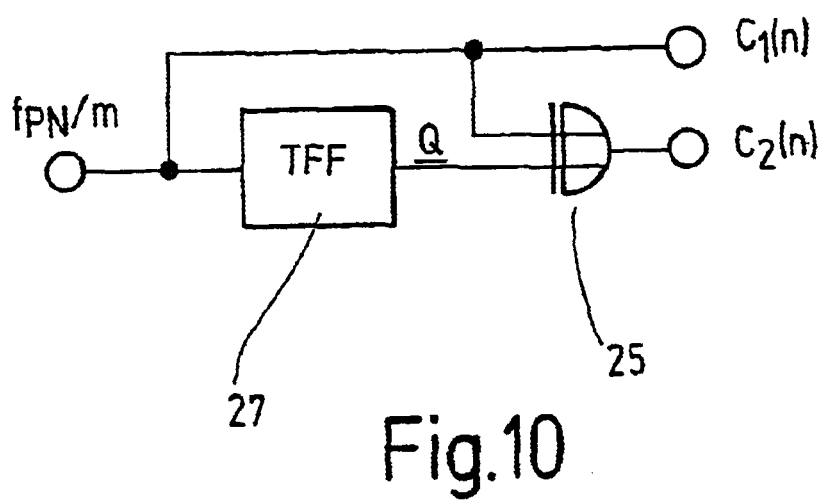
FIG. 10 shows a further schematic circuit diagram for the generation of orthogonal codes.

A simplified circuit for generating two orthogonal codes is schematically illustrated in FIG. 10. In this case, instead of a counter, a toggle flipflop (TFF) 27 is used, which, together with an EXOR gate, provides the two codes.

Figure 11:
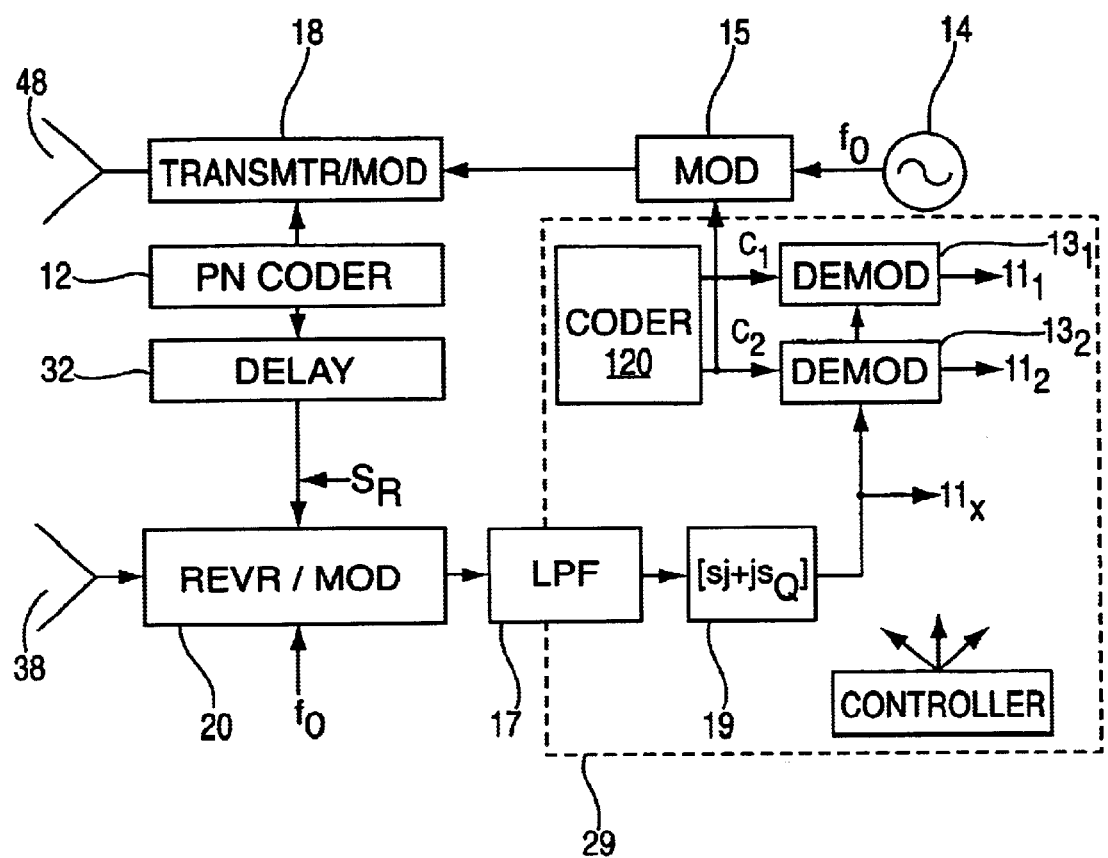
FIG. 11 shows a block diagram of a third embodiment of a radar device according to the present invention.

In FIG. 11, a circuit is illustrated in which the schematic circuit shown in FIG. 10 may be used. In FIG. 11, elements which correspond to those from FIG. 7 are again indicated using identical reference numbers. Coder 120 provides two orthogonal codes $C_1$, $C_2$ in channels $11_1$, $11_2$.

PSK modulation is used in receiving channels $11_1$, $11_2$, which simplifies the circuit. In this case, an uncoded channel $11_x$ and an additional sensor may be implemented without additional coding of the transmission signal. In the transmitting branch, PSK modulation or ASK modulation may be used by means 18 for modulation. A halved frame length results with the same number of receiving channels as coding using ASK in the receiving branch.

The present description describes the present invention largely using the example of PN codes. However, other codes could also be used instead of PN codes, such as Gold codes, M sequences, Kasami sequences, wavelets, etc.

The preceding description of the exemplary embodiments according to the present invention is used for illustrative purposes only and not for the purpose of restricting the invention.

What is claimed is:

1. A radar device, comprising:
   a first arrangement configured to generate a first code;
   a second arrangement configured to modulate a transmission signal in a transmitting branch using the first code;
   a third arrangement configured to delay the first code to form a delayed first code;
   a fourth arrangement configured to modulate a signal in a receiving branch using the delayed first code;
   a fifth arrangement configured to mix a reference signal with a reception signal;
   a plurality of receiving channels each including a sixth arrangement configured to generate a respective additional code, each additional code orthogonal to each other additional code, and a seventh arrangement configured to demodulate using the respective additional code; and
   an eighth arrangement configured to modulate the transmission signal using at least one of the additional codes.

2. The radar device as recited in claim 1, wherein:
   one of the transmission signal and the signal in the receiving branch is modulated by amplitude modulation; and
   other of the transmission signal and the signal in the receiving branch is modulated by phase modulation.

3. The radar device as recited in claim 1, wherein:
   the transmission signal is modulated using the first code by phase modulation; and
   the signal in the receiving branch is modulated in the receiving branch using the delayed first code by one of amplitude modulation and frequency modulation.

4. The radar device as recited in claim 1, wherein:
   the transmission signal is modulated using the first code by one of amplitude modulation, frequency modulation, and phase modulation; and
   the signal in the receiving branch is modulated in the receiving branch using the delayed first code by phase modulation.

5. The radar device as recited in claim 1, wherein one of a combination of a plurality of types of modulation is used for the additional codes independent of types of modulation used for the first code.

6. The radar device as recited in claim 1, further comprising a low-pass filter configured to filter the signal before demodulation.

7. The radar device as recited in claim 1, wherein at least one of the first code, the delayed first code, and the additional codes is a pseudo-noise code.

8. The radar device as recited in claim 1, wherein:
   the sixth arrangement and the seventh arrangement use a clock frequency, the clock frequency being a whole-number fraction of a pulse repetition frequency for generating the first code, the first code being a pseudo-noise code.

9. The radar device as recited in claim 1, further comprising:
   a counter; and
   a plurality of EXOR gates;
   wherein the counter and the plurality of EXOR gates are configured to generate a plurality of orthogonal codes.

10. The radar device as recited in claim 1, further comprising:
    a toggle flipflop; and
    an EXOR gate;
    wherein the toggle flipflop and the EXOR gate are configured to generate a plurality of orthogonal codes.

11. The radar device as recited in claim 1, further comprising an uncoded receiving channel if phase modulation is used in the receiving branch.

12. The radar device as recited in claim 1, further comprising a digital arrangement configured to control the delay.

13. The radar device as recited in claim 1, further comprising a circuit arrangement configured to control the delay.

14. The radar device as recited in claim 1, further comprising a ninth arrangement configured to blank a phase transition.

15. A method of coding a radar device, comprising:
    generating a first code;
    modulating a transmission signal in a transmitting branch using the first code;
    delaying the first code to form a delayed first code;
    modulating a signal in a receiving branch using the delayed first code;
    mixing a reference signal with a reception signal;
    providing a plurality of receiving channels;
    generating a corresponding plurality of additional codes in the plurality of receiving channels, the additional code in each receiving channel orthogonal with respect to the additional code of each other receiving channels;
    modulating signals in the receiving channels using the respective plurality of additional codes; and
    modulating the transmission signal using at least one of the plurality of additional codes.

16. The method as recited in claim 15, wherein:
    one of the transmission signal and the signal in the receiving branch is modulated by amplitude modulation; and
    other of the transmission signal and the signal in the receiving branch is modulated by phase modulation.

17. The method as recited in claim 15, wherein:
    the transmission signal is modulated using the first code by phase modulation; and
    the signal in the receiving branch is modulated in the receiving branch using the delayed first code by one of amplitude modulation and frequency modulation.

18. The method as recited in claim 15, wherein:

the transmission signal is modulated using the first code by one of amplitude modulation, frequency modulation, and phase modulation; and the signal in the receiving branch is modulated in the receiving branch using the delayed first code by phase modulation.

19. The method as recited in claim 15, wherein one of a combination of a plurality of types of modulation is used for the plurality of additional codes independent of types of modulation used for the first code.

20. The method as recited in claim 15, further comprising the step of filtering the signal in a low-pass filter before demodulation.

21. The method as recited in claim 15, wherein at least one of the first code, the delayed first code, and the plurality of additional codes is a pseudo-noise code.

22. The method as recited in claim 15, further comprising the step of:

demodulating;

wherein the steps of generating the plurality of additional codes and demodulating are performed using a clock frequency, the clock frequency being a whole-number fraction of a pulse repetition frequency for generating the first code.

23. The method as recited in claim 15, further comprising the step of generating a plurality of orthogonal codes by a counter and a plurality of EXOR gates.

24. The method as recited in claim 15, further comprising the step of generating a plurality of orthogonal codes by a toggle flipflop and an EXOR gate.

25. The method as recited in claim 15, further comprising the step of providing an uncoded receiving channel if phase modulation is used in the receiving branch.

26. The method as recited in claim 15, wherein the step of delaying is controlled by a digital arrangement.

27. The method as recited in claim 15, wherein the step of delaying is controlled by a circuit arrangement.

28. The method as recited in claim 15, further comprising the step of blanking a phase transition.

* * * * *

UNITED STATES PATENT AND TRADEMARK OFFICE
CERTIFICATE OF CORRECTION

PATENT NO. : 6,822,605 B2
DATED : November 23, 2004
INVENTOR(S) : Thomas Brosche It is certified that error appears in the above-identified patent and that said Letters Patent is hereby corrected as shown below:

Column 1,
Line 22, change "numerous applications" to -- various applications --.
Line 23, change "greatly varying fields" to -- varying fields --.
Line 30, change "the signals received" to -- the received signals --.
Line 32, change "In motor vehicles" to -- In motor vehicles, for example, --.
Line 58, change "Interference is" to -- Interference may be --.
Line 65, delete "also already".
Line 66, change "interference is to be achieved" to -- interference may be achieved --.

Column 2,
Line 11, change "relay systems; in this" to -- relay systems. In this --.
Line 12, change "pulse power makes" to -- pulse power may make --.
Line 27, change "it is possible" to -- it may be possible --.
Line 30, change "S/N ratio occurs" to -- S/N ratio may occur --.
Line 35, change "is preferably modulated" to -- may possibly be modulated --.
Line 37, change "signal is modulated" to -- signal may be modulated --.
Line 46, change "signal is modulated" to -- signal may be modulated --.
Line 61, change "device is particularly advantageously refined" to -- device may be refined --.
Line 65, change "is preferably provided" to -- may be provided --.

Column 3,
Line 1, delete "particularly".
Line 4, change "is possible" to -- may be possible --.
Line 7, change "must be provided" to -- may need to be provided --.
Line 9, change "domain also has" to -- domain may also have --.
Line 13, delete "extensively".
Line 15, delete "particularly well".
Line 17, change "are preferably performed" to -- may be performed --.
Line 19, change "In this way," to -- In this manner, --.
Line 21, change "It is preferably" to -- It is possible --.
Line 28, change "codes are simpler" to -- codes may be simpler --.
Line 31, change "gates are provided" to -- gates may be provided --.
Line 32, change "In this way," to -- In this manner, --.
Line 35, change "gate are provided" to -- gate may be provided --.
Line 37, change "simple way" to -- simple manner --.
Line 39, change "branch, an uncoded" to -- branch, and an uncoded --.
Line 41, change "channel is therefore possible" to -- channel may therefore be possible --.
Line 43, change "means are preferably provided" to -- means may be provided --.
Line 47, change "a suitable way," to -- a suitable manner, --.

UNITED STATES PATENT AND TRADEMARK OFFICE
CERTIFICATE OF CORRECTION

PATENT NO.     : 6,822,605 B2
DATED          : November 23, 2004
INVENTOR(S)    : Thomas Brosche It is certified that error appears in the above-identified patent and that said Letters Patent is hereby corrected as shown below:

Column 3 (cont'd),
Line 48, delete "possibly".
Line 66, change "In this way" to -- In this manner --.

Column 4,
Line 13, change "scope of the" to -- scope of an exemplary embodiment of the --.
Line 35, change "is used for" to -- may be used for --.
Line 46, change "must be provided," to -- may need to be provided, --.
Line 51, change "codes are preferably" to -- codes may be --.
Line 55, delete "preferably".
Line 60, change "In this way," to -- In this manner, --.

Column 5,
Line 6, change "In this manner" to -- In this manner, --.
Line 12, change "way by one TFF." to -- manner by one TFF. --.
Line 14, change "is additionally provided." to -- may be additionally provided. --.
Line 22, change "a suitable way." to -- a suitable manner. --.
Line 29, change "it is advantageous" to -- it may be advantageous --.
Line 31, change "errors arise" to -- errors may arise --.
Line 41, change "additional coding has" to -- additional coding may have --.
Line 41, change "In this way, it is" to -- In this manner, it may be --.
Line 51, change "modulation is necessary" to -- modulation may be necessary --.
Line 51, change "It is also" to -- It may also be --.

Column 6,
Line 3, change "an embodiment" to -- an exemplary embodiment --.
Line 5, change "a first embodiment" to -- a first exemplary embodiment --.
Line 7, change "a second embodiment" to -- a second exemplary embodiment --.
Line 14, change "a third embodiment" to -- a third exemplary embodiment --.
Line 38, change "of the present" to -- of an exemplary embodiment of the present --.

Column 7,
Line 45, change "would then be necessary." to -- would then possibly be necessary. --.
Line 65, change "must be a" to -- may need to be a --.

Column 8,
Line 1, change "it is necessary" to -- it may be necessary --.
Line 45, change "being necessary" to -- possibly being necessary --.

UNITED STATES PATENT AND TRADEMARK OFFICE
CERTIFICATE OF CORRECTION

PATENT NO. : 6,822,605 B2
DATED : November 23, 2004
INVENTOR(S) : Thomas Brosche It is certified that error appears in the above-identified patent and that said Letters Patent is hereby corrected as shown below:

Column 9,
Line 52, change "a first embodiment" to -- an exemplary embodiment --.

Column 10,
Line 61, change "must be integrated" to -- may need to be integrated --.
Line 63, change "is possibly to be lowered" to -- may be lowered --.

Column 11,
Line 16, change "describes the present invention" to -- describes an exemplary embodiment of the present invention --.
Lines 22-23, change "restricting the invention." to -- restricting the present invention. --.

Signed and Sealed this

Sixth Day of September, 2005

JON W. DUDAS
*Director of the United States Patent and Trademark Office*